United States Patent Office 3,293,327
Patented Dec. 20, 1966

3,293,327
CYCLIC PHOSPHITES AND PHOSPHATES
Ingenuin Hechenbleikner, Clarksburg, Francis C. Lanoue, North Adams, and Carl W. Pause and Ernest Bianco, Adams, Mass., assignors to Hooker Chemical Corporation, Niagara Falls, N.Y., a corporation of New York
No Drawing. Filed July 21, 1958, Ser. No. 749,606
27 Claims. (Cl. 260—936)

This invention relates to the production of new cyclic derivatives of tri and pentavalent phosphorus.

It is an object of the present invention to provide novel bicyclic phosphites.

Another object is to provide novel bicyclic phosphates.

An additional object is to provide novel bicyclic thiophosphates.

A further object is to provide novel bicyclic selenophosphates.

Yet another object is to provide new stabilizers for vinyl halide resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The objects of the invention are accomplished by the preparation of bicyclic organic derivatives of phosphorus having the formula (1) 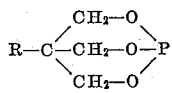

or the formula (2) 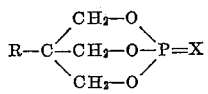

where R is hydroxylmethyl or alkyl and X is oxygen, sulfur or selenium. When R is alkyl preferably it contains 1 to 8 carbon atoms.

Compounds included in Formula 1 are prepared by transesterifying a triaryl phosphite or a trihaloaryl phosphite with pentaerythritol or a trimethylol alkane to form the corresponding pentaerythritol phosphite or trimethylol alkane phosphite. The aromatic phosphite and the polyalkylol compound are reacted in equimolecular amount, preferably in the presence of an alkaline catalyst such as sodium hydroxide, potassium hydroxide, sodium phenate, sodium hydride, potassium hydride, sodium alcoholates, e.g. sodium ethylate, quaternary ammonium bases, e.g. tetraethyl ammonium hydroxide, etc. The trimethylolalkanes are formed in conventional fashion by reacting formaldehyde with a higher aliphatic aldehyde, e.g. propionaldehyde or stearaldehyde, under alkaline conditions.

Compounds included in Formula 2 are prepared by either reacting the compounds of Formula 1 with an oxidizing agent in the case where X is oxygen or by reacting with elemental sulfur when X is sulfur or with elemental selenium when X is selenium. As oxidizing agents there can be used hydrogen peroxide as well as other peroxides, e.g. sodium peroxide, barium peroxide, benzoyl peroxide, cumene hydroperoxide or persulfates, e.g. sodium persulfate, potassium persulfate, etc.

Typical examples of bicyclic phosphorus compounds within the instant invention are pentaerythritol phosphite, trimethylolpropane phosphite, trimethylolethane phosphite, trimethylolbutane phosphite, trimethylol isobutane phosphite, trimethylol pentane phosphite, trimethylolhexane phosphite, trimethylolheptane phosphite, trimethylol octane phosphite, trimethylolnonane phosphite, trimethylolundecane phosphite, trimethylolheptadecane phosphite, pentaerythritol phosphate, pentaerythritol thiophosphate, pentaerythritol selenophosphate, trimethylolpropane phosphate, trimethylolpropane thiophosphate, trimethylol propane selenophosphate, trimethylolethane phosphate, trimethylolethane thiophosphate, trimethylolethane, selenophosphate, trimethylolbutane phosphate, trimethylol butane thiophosphate, trimethylolpentane phosphate, trimethylolpentane thiophosphate, trimethylolpentane selenophosphate, trimethylolhexane phosphate, trimethylolhexphosphate, trimethylolheptane phosphate, trimethylolheptane, thiophosphate, trimethyloloctane phosphate, trimethyloloctane thiophosphate, trimethylolnonane phosphate, trimethylolnonane thiophosphate, trimethylolnonane selenophosphate, trimethyloldecane phosphate, trimethyloldecane thiophosphate, trimethylolundecane phosphate, trimethylolundecane thiophosphate, trimethylolheptadecane phosphate, trimethylolheptadecane thiophosphate and trimethylolheptadecane selenophosphate.

The compounds of the present invention have numerous uses. Thus they can be employed as heat stabilizers for vinyl halide resins, e.g. as heat stabilizers for vinyl chloride resins. They also are useful as antioxidants for natural and synthetic rubbers and as antioxidants for fats and oils. The phosphates and thiophosphates are useful as flameproofing agents for cotton and other cellulosic textile materials. The hydroxymethyl group present in pentaerythritol phosphite, pentaerythritol phosphate, pentaerythritol thiophosphate, and pentaerythritol selenophosphate is reactive and can be used to form end groups on isocyanate resins (polyurethanes).

Unlike most organic phosphites many of the phosphites of the present invention are water soluble.

It is important that the triaryl phosphite or trihaloarylphosphite be reacted with pentaerythritol in the ratio of at least 1 mol of the pentaerythritol per mol of the aromatic phosphite.

The present reaction also is apparently exclusive to pentaerythritol and the trimethylolalkanes since glycerine does not undergo the reaction but instead forms polymers when reacted with triaryl phosphites or trihaloaryl phosphites.

As the triaryl phosphite or trihaloaryl phosphite starting material there can be employed any of those mentioned in Hechenbleikner Patent 2,834,798 for example among such aromatic phosphites which are suitable as starting materials are triphenyl phosphite, tris (2-methylphenyl) phosphite; tris (3-methylphenyl) phosphite; tris (4-methylphenyl) phosphite; tris (2-chlorophenyl) phosphite; tris (3-chlorophenyl) phosphite; tris (4-chlorophenyl) phosphite; tris (2,4-dichlorophenyl) phosphite; tris (2-bromophenyl) phosphite; tris (4-iodophenyl) phosphite; tris (2-fluorophenyl) phosphite; tris (2-chloro-4-bromophenyl) phosphite; tris (2-ethylphenyl) phosphite; tris (2-cyclohexylphenyl) phosphite; tris (4-octylphenyl) phosphite; tris (2,4-dimethylphenyl) phosphite; tris (4-dodecylphenyl) phosphite; tris (4-sec. butylphenyl) phosphite; tris (4-tert. butylphenyl) phosphite; tris (α-naphthyl) phosphite.

Unless otherwise stated, all parts and percentages in the specification and claims are by weight.

*Example 1*

| | |
|---|---:|
| Triphenyl phosphite (5 mols) | g\_\_ 1550 |
| Trimethylolpropane (5 mols) | g\_\_ 670 |
| Phenol | ml\_\_ 500 |
| Sodium hydride | g\_\_ 5 |

The sodium hydride was added to a mixture of the phenol and triphenyl phosphite. When the reaction was complete the solution was alkaline. The trimethylol propane was then added all at once. The resulting slurry was heated to 110° C. and maintained at that temperature for 30 minutes with stirring. A homogeneous solution resulted. Phenol was distilled from the reaction mixture under reduced pressure (68° C./8 mm.) and the residue fractionated. The yield of trimethylol propane phosphite was 630.8 g. (78% of theory); B.P. 100° C./8 mm.; M.P. 56.5° C.

The trimethylolpropane phosphite had the formula

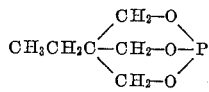

Example 2

| | G. |
|---|---|
| Triphenyl phosphite (6 mols) | 1860 |
| Trimethylolethane (6 mols) | 720 |
| Phenol | 100 |
| Sodium hydride | 6.5 |

The triphenyl phosphite, sodium hydride and phenol were mixed and heated to 70° C. The trimethylolethane was added and dissolved while the mixture was heated at 80° C. over a half-hour period. The product was stripped through a 60 cm. column. The trimethylolethane phosphite product having the formula

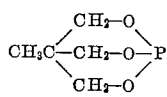

recovered had a melting point of 79–80° C., and a boiling point of 95° C./9 mm. The yield was 87.0%.

Example 3

| | G. |
|---|---|
| Triphenyl phosphite (1 mol) | 310 |
| Pentaerythritol (nitration grade) (1 mol) | 136 |
| Phenol | 200 |
| Sodium hydroxide | 1 |

The sodium hydroxide and phenol were mixed together to form sodium thenate. Approximately 100 g. of phenol was removed by distillation. Then the triphenyl phosphite and pentaerythritol were added at 70–75° C. and the reaction mixture heated at this temperature for one hour and then at 85–100° C. for an additional hour at which time all the reagents were in solution. Phenol was stripped off and the pentaerythritol phosphite product having the formula

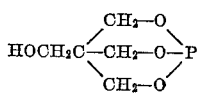

was recovered by distillation. The product had a boiling point of 112° C./0.3 mm. and was a crystalline solid melting at 62–64° C. The yields were about 85%. The pentaerythritol phosphite was soluble in water, benzene, hexane and alcohol.

Example 4

| | | |
|---|---|---|
| Tris (2-methylphenyl) phosphite | mols | 1 |
| Trimethlolpropane | do | 1 |
| Phenol | ml | 100 |
| Sodium hydride | g | 1 |

The process of Example 1 was repeated and trimethylolpropane phosphite was recovered as the final product.

Example 5

| | | |
|---|---|---|
| Tris (4-chlorophenyl) phosphite | mols | 1 |
| Trimethylolethane | do | 1 |
| Phenol | ml | 100 |
| Sodium hydride | g | 1 |

The process of Example 1 was repeated and trimethylolethane phosphite was recovered as the final product.

Example 6

| | | |
|---|---|---|
| Triphenyl phosphite | mols | 1 |
| Trimethylolpentane | do | 1 |
| Phenol | ml | 100 |
| Sodium hydride | g | 1 |

The process of Example 1 was repeated and trimethylolpentane phosphite having the formula

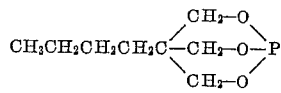

was recovered as the final product.

Example 7

| | | |
|---|---|---|
| Trimethylolheptane | mols | 1 |
| Triphenyl phosphite | do | 1 |
| Phenol | ml | 100 |
| Sodium hydride | g | 1 |

The process of Example 1 was repeated and trimethylolheptane phosphite was recovered as the final product.

Example 8

| | | |
|---|---|---|
| Triphenyl phosphite | mols | 1 |
| Trimethylolundecane | do | 1 |
| Phenol | ml | 100 |
| Sodium hydride | g | 1 |

The process of Example 1 was repeated and trimethylolundecane phosphite recovered as the final product.

Example 9

| | | |
|---|---|---|
| Triphenyl phosphite | mols | 1 |
| Trimethylolheptadecane | do | 1 |
| Phenol | ml | 100 |
| Sodium hydride | g | 1 |

The process of Example 1 was repeated and trimethylolheptadecane phosphite recovered as the final product.

Example 10

| | | |
|---|---|---|
| Trimethylolpropane phosphite (0.25 mol) | g | 37 |
| Sulfur (0.25 mol) | g | 8 |
| Toluene | ml | 50 |

The reagents were refluxed for four hours at 116° C. On cooling the product crystallized out. The trimethylolpropane thiophosphate recovered had the formula

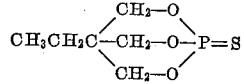

and had a melting point on recrystallization of 174–176° C.

Example 11

Example 10 was repeated replacing the 0.25 mol of sulfur by 0.25 mol of selenium to recover trimethylolpropane selenophosphate having the formula

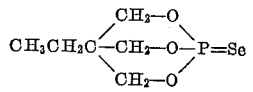

Example 12

Example 10 was repeated replacing the trimethylolpropane phosphite by 0.25 mol of trimethylolethane phosphite to obtain trimethylolethane thiophosphate.

Example 13

| | | |
|---|---|---|
| Pentaerythritol phosphite | mols | 0.25 |
| Sulfur | do | 0.25 |
| Toluene | ml | 50 |

The process of Example 10 was repeated and there was obtained pentaerythritol thiophosphate as the final product.

Example 14

| | | |
|---|---|---|
| Trimethylolheptane phosphite | mols | 0.25 |
| Sulfur | do | 0.25 |
| Toluene | ml | 50 |

The process of Example 10 was repeated and there was recovered trimethylolheptane thiophosphate as the final product.

Example 15

| | | |
|---|---|---|
| Trimethylolheptadecane phosphite | mols | 0.25 |
| Sulfur | do | 0.55 |
| Toluene | ml | 50 |

The process of Example 10 was repeated and there was recovered trimethylolheptadecane thiophosphate as the final product.

Example 16

| | Mols |
|---|---|
| Trimethylolethane phosphite | 0.1 |
| $H_2O_2$, 50% in isopropanol | 0.1 |

The alcoholic hydrogen peroxide was added to the phosphite in 50 ml. of isopropanol. After evaporation of the solvent at 15 mm. the trimethylolethane phosphate remained as a colorless crystalline solid having a melting point of 245° C. and having the formula

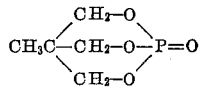

The product was soluble in water, insoluble in hexane and was recrystallized from ethyl alcohol.

Example 17

Example 16 was repeated replacing the trimethylolethane phosphite by 0.1 mol trimethylolpropane phosphite to recover trimethylol propane phosphate as the final product.

Example 18

| | Mols |
|---|---|
| Pentaerythritol phosphite | 0.1 |
| $H_2O_2$, 50% in isopropanol | 0.1 |

The process of Example 16 was repeated and there was obtained pentaerythritol phosphate as the final product.

Example 19

| | Mols |
|---|---|
| Trimethylolheptane phosphite | 0.1 |
| $H_2O_2$, 50% in isopropanol | 0.1 |

The process of Example 16 was repeated and there was obtained trimethylolheptane phosphate as the final product.

Example 20

| | Mols |
|---|---|
| Trimethylolheptadecane phosphite | 0.1 |
| $H_2O_2$, 50% in isopropanol | 0.1 |

The process of Example 16 was repeated and there was obtained trimethylolheptadecane phosphate as the final product.

We claim:
1. Compounds selected from the group consisting of

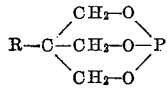

and

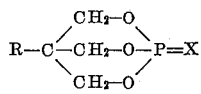

where R is selected from the group consisting of hydroxymethyl and 1 to 16 carbon atom alkyl and X is selected from the group consisting of oxygen, sulfur and selenium.

2. Pentaerythritol phosphite.
3. Pentaerythritol phosphate.
4. Pentaerythritol thiophosphate.
5. 1,1,1-trimethylolalkane phosphites wherein the alkane group has 2 to 17 carbon atoms.
6. 1,1,1-trimethylolalkane phosphates wherein the alkane group has 2 to 17 carbon atoms.
7. 1,1,1-trimethylolalkane thiophosphates wherein the alkane group has 2 to 17 carbon atoms.
8. 1,1,1-trimethylolethane phosphite.
9. 1,1,1-trimethylolpropane phosphite.
10. 1,1,1-trimethylolethane phosphate.
11. 1,1,1-trimethylolpropane phosphate.
12. 1,1,1-trimethylolethane thiophosphate.
13. 1,1,1-trimethylolpropane thiophosphate.
14. A compound of the formula

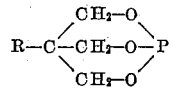

wherein R is a member of the class consisting of a lower alkyl group and the hydroxymethyl group.

15. A method of preparing a trimethylol alkane trihalophenyl phosphite consisting of triaryl phosphites wherein the aryl group is selected from the group consisting of phenyl, lower alkyl phenyl, cyclohexyl phenyl and naphthyl and trihalophenyl phosphites with a trimethylol alkane wherein the 3 methylol groups are attached to the same carbon atom.

16. A method of preparing a trimethylol alkane phosphite having 2 to 9 carbon atoms in the alkyl group comprising transesterifying triphenyl phosphite with a trimethylolalkane having 2 to 9 carbon atoms in the alkyl group wherein the 3 methylol groups are attached to the same carbon atom.

17. A method of preparing pentaerythritol phosphite comprising transesterifying an aromatic phosphite selected from the group consisting of triaryl phosphites wherein the aryl group is selected from the group consisting of phenyl, lower alkyl phenyl, cyclohexyl phenyl and naphthyl and trihalophenyl phosphites with pentaerythritol in the mol ratio of at least one mol of the pentaerythritol per mol of the aromatic phosphite.

18. A method of preparing a 1,1,1-trimethylolalkane phosphate wherein the alkane group has 1 to 17 carbon atoms comprising reacting the corresponding trimethylolalkane phosphite with an oxidizing agent.

19. A method of preparing pentaerythritol phosphate comprising oxidizing pentaerythritol phosphite with an oxidizing agent.

20. A compound of the formula

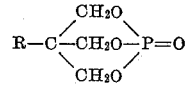

wherein R is a member of the class consisting of a lower alkyl group and the hydroxymethyl group.

21. A method of making a compound of the formula

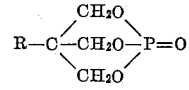

wherein R is a member of the class consisting of a lower alkyl group and the hydroxymethyl group comprising reacting a compound having the formula

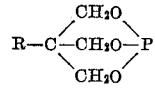

wherein R has the significance above indicated with an oxidizing agent.

22. A method of preparing a trimethylol alkane phosphite having 2 to 3 carbon atoms in the alkyl group comprising transesterifying one mol of a triaryl phosphite with one mol of a trimethylol alkane having 2 to 3 carbon atoms in the alkyl group, the 3 methylol groups being attached to the same carbon atom.

23. A method of preparing a phosphite of the formula

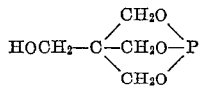

comprising transesterifying one mol of a triaryl phosphite with one mol of pentaerythritol.

24. A compound of the formula:

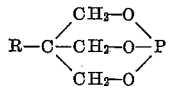

wherein R is a lower alkyl radical.

25. A compound of the formula:

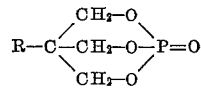

wherein R is a lower alkyl radical.

26. A compound of the formula:

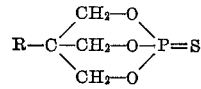

wherein R is a lower alkyl radical.

27. A compound of the formula

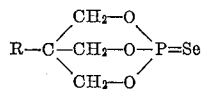

wherein R is a lower alkyl radical.

References Cited by the Examiner

UNITED STATES PATENTS 2,643,261  6/1958  Matuszak et al. ___ 260—461.304
2,847,443  8/1958  Hechenbleikner et al.
                                    260—461.304

OTHER REFERENCES

Carre, Bull. Soc. Chim. de France, 27 (3), 261–269 (1902).

Kosolapoff, Organo Phosphorus Compounds, pp. 231, 235 and 236 (1950 edition), John Wiley and Sons, New York, N.Y.

LEON J. BERCOVITZ, *Primary Examiner.*

ABRAHAM H. WINKELSTEIN, WILLIAM H. SHORT, *Examiners.*

D. D. HORWITZ, H. E. TAYLOR, *Assistant Examiners.*

UNITED STATES PATENT OFFICE
CERTIFICATE OF CORRECTION

Patent No. 3,293,327　　　　　　　　　　　　　　December 20, 1966

Ingenuin Hechenbleikner et al.

It is certified that error appears in the above identified patent and that said Letters Patent are hereby corrected as shown below:

Column 2, line 14, "nae" should read -- ane --. Column 6, line 22, beginning with "A method" cancel all to and including "same carbon atom." in line 28, same column 6, and insert -- A method of preparing a trimethylol alkane phosphite comprising transesterifying a compound selected from the group consisting of trihalophenylphosphite and triarylphosphites wherein the aryl group is phenyl, lower alkyl phenyl, cyclohexyl phenyl or naphthyl, with a trimethylol alkane wherein the three methylol groups are attached to the same carbon atom. --.

Signed and sealed this 16th day of September 1969.

(SEAL)

Attest:

Edward M. Fletcher, Jr.

Attesting Officer

WILLIAM E. SCHUYLER, JR.

Commissioner of Patents